United States Patent [19]
Perlman

[11] Patent Number: 5,620,662
[45] Date of Patent: Apr. 15, 1997

[54] TEMPORARY LIQUID STORAGE CAVITIES IN A CENTRIFUGE TUBE LID

[75] Inventor: Daniel Perlman, Arlington, Mass.

[73] Assignee: Brandeis University, Waltham, Mass.

[21] Appl. No.: 445,371

[22] Filed: May 19, 1995

Related U.S. Application Data

[63] Continuation-in-part of Ser. No. 219,840, Mar. 30, 1994, Pat. No. 5,462,881, which is a continuation-in-part of Ser. No. 215,132, Mar. 18, 1994, abandoned, which is a continuation-in-part of Ser. No. 110,313, Aug. 23, 1993, abandoned.

[51] Int. Cl.⁶ ................................................ G01N 21/07
[52] U.S. Cl. ...................... 422/102; 422/58; 422/72; 422/100; 422/104; 215/320; 215/355; 435/288.4; 435/283.1
[58] Field of Search ................ 422/58, 72, 100, 422/102, 104; 435/296, 299–301; 215/320, 355

[56] References Cited

U.S. PATENT DOCUMENTS

| | | | |
|---|---|---|---|
| 3,415,361 | 12/1968 | Adams, Jr. et al. | 206/221 |
| 3,976,579 | 8/1976 | Bennett | 210/516 |
| 4,279,863 | 7/1981 | Friehler | 422/102 |
| 4,469,793 | 9/1984 | Guigan | 436/45 |
| 4,713,219 | 12/1987 | Gerken et al. | 422/102 |
| 4,755,356 | 7/1988 | Robbins et al. | 422/102 |
| 4,942,017 | 7/1990 | Turpen | 422/64 |
| 4,980,293 | 12/1990 | Jeffs et al. | 435/296 |
| 5,073,341 | 12/1991 | Hargreaves | 422/58 |
| 5,167,929 | 12/1992 | Korf et al. | 422/102 |
| 5,202,093 | 4/1993 | Cloyd | 422/102 |
| 5,254,314 | 10/1993 | Yu et al. | 422/102 |
| 5,270,011 | 12/1993 | Altherr | 422/102 |
| 5,382,408 | 1/1995 | Perlman | 422/102 |

*Primary Examiner*—Harold Pyon
*Attorney, Agent, or Firm*—Thorpe, North & Western

[57] ABSTRACT

A centrifuge tube with temporary liquid storage cavities. The centrifuge tube has an upper opening and defines a specimen enclosure therein. The tube includes a lid for sealably covering the upper opening. Temporary liquid holding cavities are formed upon the underside of the lid so as to extend outwardly from the underside and terminate in open distal ends. One or more liquid components or reagents can be inserted directly into the open distal ends of the cavities so as to reside inside the cavities on the lid. The cavities are sufficiently narrow so that the walls of each cavity are disposed in frictional engagement with the liquid to increase the surface tension and adherence of the liquid within the cavity. The lid can be snapped shut over the opening of the tube without discharging the liquid components from the cavities, so that the liquid components hang in open suspension above the bottom of the tube. The liquid components are dislodged from the cavities and fall to the bottom of the tube upon centrifugation of the tube.

13 Claims, 2 Drawing Sheets

TEMPORARY LIQUID STORAGE CAVITIES IN A CENTRIFUGE TUBE LID

This is a continuation-in-part of U.S. patent application Ser. No. 08/219,840, filed on Mar. 30, 1994, and now U.S. Pat. No. 5,462,881, issued on Oct. 31, 1995, entitled "Temporary Liquid Storage Cavities In A Centrifuge Tube," which is a continuation-in-part of U.S. patent application Ser. No. 08/215,132, filed on Mar. 18, 1994, entitled "Temporary Liquid Storage Cavities In A Centrifuge Tube" (now abandoned), which was a continuation-in-part of U.S. patent application Ser. No. 08/110,313, filed on Aug. 23, 1993, entitled "Specimen Well With Cavity Regulating Flow-Restrictive Channel" (now abandoned).

BACKGROUND OF THE INVENTION

1. The Field of the Invention

The present invention relates generally to centrifuge tubes. More particularly, it concerns a centrifuge tube having temporary liquid storage cavities formed upon a removable lid of the tube.

2. The Background Art

There is often a need in the practice of centrifugation to induce mixing of one or more reagents with a specimen contained in a centrifuge tube at a precise time. It is known to provide reagent-retaining structures, such as temporary storage cavities or ledges, on the inner side walls of a centrifuge tube. A precise amount of reagent is placed upon the retaining structure with a pipette tip or the like. The retaining structure prevents the reagent from mixing with the specimen in the bottom of the tube until centrifugal force is applied to the tube.

However, the prior art centrifuge tubes are characterized by a number of disadvantages. There is limited access to the reagent-retaining structures because of the narrow opening of the centrifuge tube. The limited access increases the difficulty involved in dispensing and placing the reagent properly. The reagent-retaining structures often occupy space in the opening or in the central portion of the centrifuge tube, which reduces the space available for unencumbered mixing action. Further, the prior art reagent-retaining structures are not able to retain the reagent if the centrifuge tube is inadvertently turned upside down.

OBJECTS AND SUMMARY OF THE INVENTION

It is therefore an object of the present invention to provide a centrifuge tube having temporary reagent storage cavities and increased access to the cavities.

It is an additional object of the invention to provide such a centrifuge tube with increased access to the opening of the tube.

It is another object of the invention to provide such a centrifuge tube which is capable of retaining liquid components in the temporary storage cavities regardless of the position or orientation of the tube.

It is a further object of the invention to provide such a centrifuge tube which is simple in design and manufacture.

The above objects and others not specifically recited are realized in a specific illustrative embodiment of a centrifuge tube with temporary liquid storage cavities. The centrifuge tube has an upper opening and defines a specimen enclosure therein. The tube includes a lid for sealably covering the upper opening. Temporary liquid holding cavities are formed upon the underside of the lid so as to extend outwardly from the underside and terminate in open distal ends. One or more liquid components or reagents can be inserted directly into the open distal ends of the cavities so as to reside inside the cavities on the lid. The cavities are sufficiently narrow so that the walls of each cavity are disposed in frictional engagement with the liquid to increase the surface tension and adherence of the liquid within the cavity. The lid can be snapped shut over the opening of the tube without discharging the liquid components from the cavities, so that the liquid components hang in open suspension above the bottom of the tube. The liquid components are dislodged from the cavities and fall to the bottom of the tube upon centrifugation of the tube.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

Figure 1:
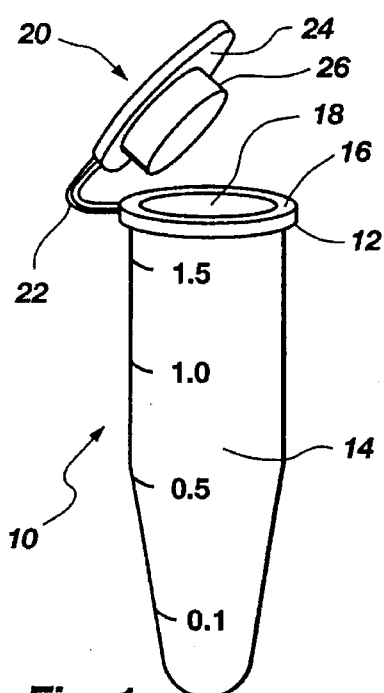
FIG. 1 is a perspective view of a centrifuge tube.
Figure 2B:
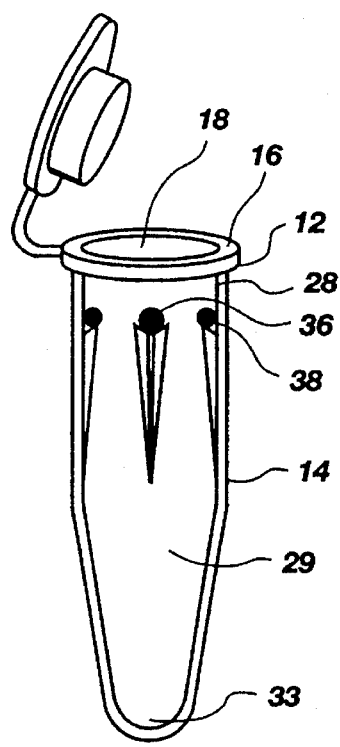
FIGS. 2A–B are perspective view of a centrifuge tube made in accordance with the principles of the present invention.
Figure 2A:
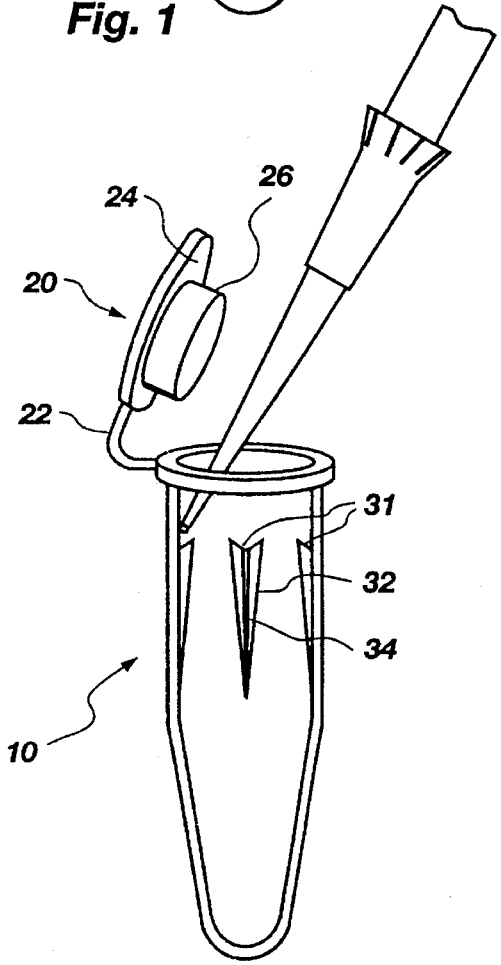
Figure 3:
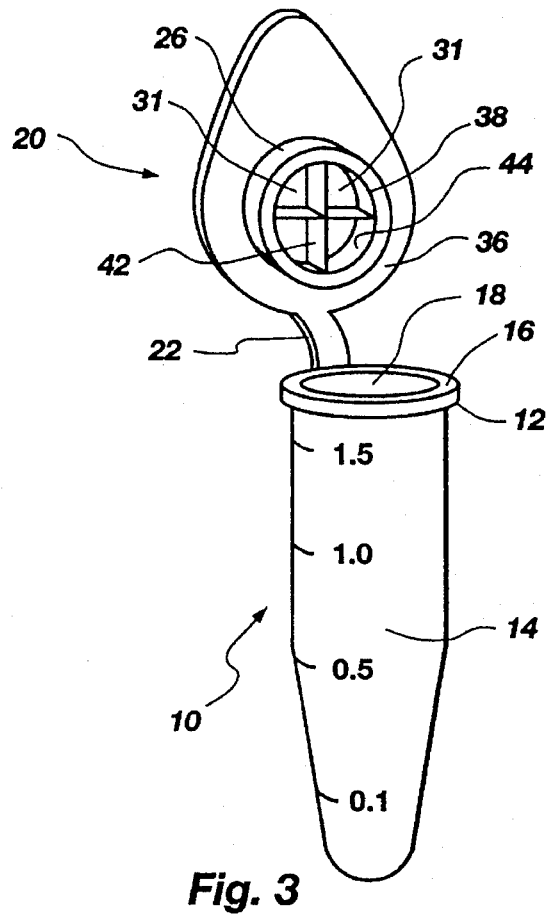
FIG. 3 is a perspective view of an alternative embodiment of a centrifuge tube made in accordance with the principles of the present invention, the tube having temporary liquid storage cavities formed on the lid.

Referring to FIGS. 1–3, microcentrifuge tube 10 (approximately 1.5 inches long and 0.44 inches in diameter) is typically injection molded from virgin polypropylene or polyethylene and has a lip flange 12 which is used to support the tube in a microcentrifuge rotor or in a storage rack. Generally the microcentrifuge tube is formed with a container 14 having an upper perimeter wall surface 16 (defining an upper opening 18) adapted to mate with lid 20 (see FIGS. 1 and 2). Lid 20 is attached to container 14 by lid hinge 22, and may be lifted upward and moved above container 14 using lid lifting tab 24. Typically a fingernail or container opening tool is used to exert upward force on lid lifting tab 24. Lid 20 also includes an annular lid seal 26 (located on the underside of the lid 20) which provides and establishes a watertight hermetic (or aseptic) friction seal with the inner perimeter wall surface, i.e., inner wall 28 of the specimen well 29 of container 14.

Referring to FIGS. 1–2, a means is provided for temporarily storing at least one liquid component within a container 14 and specimen well 29 by placing it into liquid-holding cavity 31 of pocket 32 located on inner perimeter wall surface 28 above a bottom region 33 of specimen well 29 (for later transfer to bottom region 33). For the purpose of this transfer, cavity 31 is fitted with, and connected to a flow-restrictive channel 34 which serves as a drain. Large and small droplets 36 and 38 respectively of one or more liquid components may be placed for subsequent transfer and/or combining with other components and chemical substances in bottom region 33 of specimen well 29.

Figure 5:
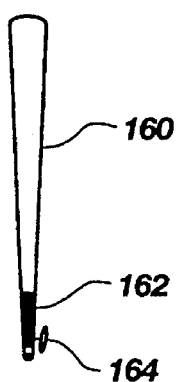
FIG. 5 is a perspective view of a liquid component held in a pipette.

In these figures, pocket 32 is drawn as a structure added to, i.e., protruding from the inner perimeter wall surface 28 of the centrifuge tube 29. However, pocket 32 can be equally effective, for the purposes of the present invention, as a recessed liquid-holding shelf or pocket notched into the inner perimeter wall surface 28 of the specimen well (FIG. 5). Such a recessed pocket would have a flow-restrictive drain channel 34 functioning in the same manner as that described for the protruding ledge 32. When viewed from the front (FIG. 2), the cavity 31 is typically V-shaped and, when viewed from the side (FIG. 3), is sloped downward at an angle toward the inner perimeter wall surface 28 of specimen well 29, to funnel all liquid in cavity 31 downward through drain channel 34. Drain channel 34 is typically narrow, e.g., 0.5 mm width or less, is vertically connected to cavity 31, and may be in any desired shape, e.g., an open groove or slit (as shown) or a closed tube or capillary.

Referring to FIG. 3, a means is provided for temporarily storing at least two liquid components within a microcentrifuge tube 10 which includes container 14 having lid 20 which is attached to the container 14 by a lid hinge 22. Container 14 is formed with an upper perimeter wall surface 16 (defining an upper opening 18) adapted to mate with lid 20. This means of storing liquid (also used with other lid structures such as screw cap lids) involves providing at least two liquid-holding cavities 31 formed on, or in the underside, i.e., the bottom wall surface 36 of lid 20. Each cavity 31 is defined by an outer perimeter edge 38 generally representing the outer limit and maximum volume for a liquid component stored in the cavity 31. In the case of hinged lid 20 which includes an annular lid seal 26, it is convenient to fabricate multiple liquid-holding cavities 31 in the form of sectored walled compartments within this annular structure. The geometry of such liquid-holding cavities may vary from lid to lid depending upon the structure of a particular lid. In FIG. 3, four such walled cavities or compartments 31, formed using either injection-molded polypropylene or polyethylene thermoplastic resin, are shown. To avoid altering the elasticity and sealing properties of the annular lid seal 26, the radial walls 42 do not abut or otherwise contact this lid seal 26, but rather abut a concentric inner ring wall 44 to form closed-walled sectored compartments. Each cavity 31 holds approximately 25 microliters of liquid, while container 14 holds approximately 1.5 milliliters of liquid.

During use, a liquid droplet or droplets are placed on top of each desired centrifuge tube pocket or in each lid compartment. Other liquid or solid materials are placed at the bottom of the well as needed. Precise mixing of the materials at a desired point in time can be achieved by centrifugation of the tube either by hand or in a centrifuge.

Tubes of this invention can be fabricated using standard methodology.

Figure 4:
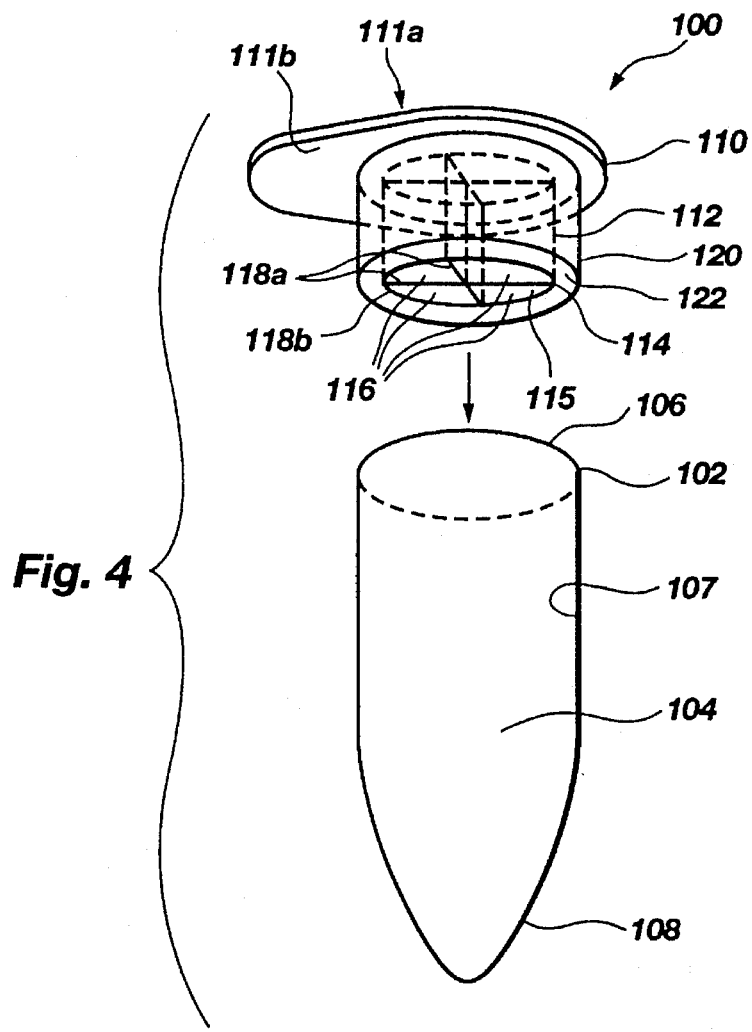
FIG. 4 is an additional perspective view of the centrifuge tube of FIG. 3, showing the lid removed from the tube in schematic form.

The invention will now be described in reference to the additional perspective view shown in FIG. 4. The structure, features and embodiment of the invention shown in FIG. 4 are also included identically in the structure, features and embodiment shown in FIG. 3. However, different reference numerals are used in FIG. 4 because of the different perspective view illustrated therein, for purposes of clarity.

Referring now to FIG. 4, therein is shown a centrifuge tube designated generally at 100. The tube 100 includes a tube body or container 102 defining a specimen enclosure 104 therein and having an open end 106 and an opposing closed end 108. A suitable lid means, such as a cap or lid 110 having opposing upper and lower surfaces 111a and 111b respectively, is provided for removably covering the open end 106 of the tube body 102. A suitable liquid-holding cell means, such as a hollow holding cell 112, extends outwardly from the lid 110 and terminates in an open distal end 114. The cell 112 is provided for receiving and holding a liquid component or reagent 162 (FIG. 5; not shown in FIG. 4) therein such that gravitational force is insufficient to induce passage of the liquid component 162 from the cell 112 even when the open distal end 114 is facing downwardly. The cell 112 is disposed such that the open distal end 114 extends into the tube body 102 when the lid 110 is covering the open end 106 of the tube body.

The hollow holding cell 112 may comprise a single cell, but preferably comprises a plurality of temporary liquid storage cavities or cell sectors 116 formed by side walls 118a–b. The sectors 116 thus each have their own open distal end as part of the open distal end 114 of the cell 112. The sectors 116 are configured and dimensioned to receive the liquid component 162 (FIG. 5) through the open distal end 114. Each cell sector 116 is sufficiently narrow such that surface tension of the liquid component 162 is enhanced when the liquid component is disposed in frictional engagement against the side walls 118a–b of the sector.

One or more liquid components or reagents 162 can be inserted directly into the open distal ends 114 of the sectors 116 so as to reside inside the sectors. The sectors 116 are sufficiently narrow so that the side walls 118a–b of a sector holding a liquid component 162 are disposed in frictional engagement with the liquid to increase the surface tension and adherence of the liquid within the sector 116. The lid 110 can be snapped shut over the opening 106 of the tube body 102 without discharging the liquid components 162 from the sectors 116, so that the liquid components 162 effectively hang in open suspension above the closed bottom 108 of the tube body 102. The liquid components 162 are dislodged from the sectors 116 and fall to the closed bottom 108 of the tube 100 upon centrifugation of the tube. In this manner, one or more liquid components 162 held in the sectors 116 can be dispensed to the closed bottom 108 of the tube 100 at precisely a desired point in time, for example to react with a specimen (not shown) contained in the specimen enclosure 104.

The tube 100 thus provides a simple method for loading liquid components and causing them to be discharged to the closed bottom 108 of the tube 100 at a precise moment. The lid 100 is preferably attached to the tube body 102 by any suitable hinge member (not shown in FIG. 4) to permit the lid 110 to be tilted upside down, so that the open distal ends 11 of the sectors 116 are facing upwardly. A pipette 160 (FIG. 5) or other suitable liquid dispenser can be used to inject a precise amount of the liquid component 162 directly into the sectors 116 from a spigot 164. It will be appreciated that each sector 116 is preferably formed to be sufficiently narrow so that gravitational force is insufficient to overcome the enhanced surface tension of a liquid component 162 residing therein to induce passage of the liquid component from the sector 116, even when the open distal end 114 is facing downwardly.

The tube 100 also includes sealing means, such as a tubular sealing wall 120, for establishing a moisture-tight seal of the lid 110 over the open end 106 of the tube body 102, such that moisture is substantially prevented from passing through the open end 106 when the lid 110 is closed. The tubular sealing wall 120 extends outwardly from the lid 100 and surrounds the hollow holding cell 112, preferably in substantially co-axial orientation therewith.

The lid 110 is configured to snap shut over the open end 106 of the tube body 102 in a sealable manner. For example, the tubular sealing wall 120 can be formed to be slightly wider than the open end 106 and with a matching shape. The tube 100 would be closed when the sealing wall 120 is inserted telescopically into the open end 106 so as to be held in compression by the interior side walls 107 of the tube body 102. The sealing wall 120 has sufficient elastic memory to thereby exert a radially outwardly directed force against the walls 107 to thereby seal the open end 106 such that moisture is substantially prevented from passing therethrough.

The sealing wall 120 surrounds the cell 112 in such a manner that the cell is prevented from interfering with the moisture-tight seal. More specifically, the tubular sealing wall 120 and the hollow holding cell 112 preferably cooperatively define an annular passage 122 therebetween, to thereby isolate the hollow holding cell 112 from contact with the tubular sealing wall 120. As a less desirable but feasible alternative, it is possible that the hollow holding cell 112 can be formed to be contactably circumscribed by the sealing wall 120 (i.e. eliminating the annular passage 122) without substantial interference to the moisture-tight seal. As a further alternative, the sealing wall 120 may be eliminated and the hollow holding cell 112 formed to mate in frictional compression itself against the walls 107 of the tube body 102. This alternative is, however, less desirable because the internal side walls 118a of the sectors 116 would tend to interfere with uniform compressive contact of the perimeter side walls 118b against the walls 107 of the tube body 102. Thus, the cap or lid 110 and the hollow holding cell 112 can be collectively described as a capping means, the capping means preferably also including the tubular sealing wall 120.

Many alternative embodiments of the hollow holding cell 112 can be made in accordance with the principles of the present invention. For example, the lid 110 could be thicker and the cell 112 could be recessed within the lid 110 so as to form a part of the lid means. The cell 112 could simply take the form of one of more holes formed in the underside of the lid 110, or even extending entirely through the lid 110 to enable placement of the liquid component 162 into the cell 112 even when the lid 110 is closed. The cell 112 is thus disposed such that the open distal end 114 faces the specimen enclosure 104 when the lid 110 is covering the open end 106 of the tube body 102.

As mentioned above, the hollow holding cell 112 may comprise a single liquid-holding cavity or a plurality of cavities. The cell 112 includes interior side walls 115. Most preferably, at least one internal side wall 118a is attached at opposing edges thereof to opposing portions of the interior side walls 115 of the cell 112 so as to extend across the hollow cell 112 and divide the cell into the plurality of holding sectors 116. The holding sectors 116 are thereby configured to hold a corresponding plurality of liquid components 162 in isolation from contact with each other, such that gravitational force is insufficient to induce passage of the liquid components from the sectors 116 even when the open distal end 114 of the holding cell 112 is facing downwardly. As shown by the preferred embodiment of FIG. 4, the internal sector side walls 118a comprise a plurality of intersecting walls secured at their edges to the interior side walls 115 of the cell 112 to thereby divide the cell such that the plurality of holding sectors 116 comprises four pie-shaped holding sectors as shown. Regardless of the specific embodiment or configuration of the hollow holding cell 112, it is configured and dimensioned to enable substantially all of any liquid component residing therein to be dislodged from the open distal end 114 of the cell to enable the liquid component to fall into the specimen enclosure 104 when centrifugal force is applied to the tube body 102.

In accordance with the principles of the present invention, a preferred method of manufacturing a centrifuge tube comprises the step of:

(a) forming a tube body defining a specimen enclosure therein and having an open end and an opposing closed end;

(b) forming lid means for removably covering the open end of the tube body; and (c) forming liquid-holding cell means extending outwardly from the lid means and terminating in an open distal end for holding a liquid component therein such that gravitational force is insufficient to induce passage of the liquid component from the liquid-holding cell means even when the open distal end is facing downwardly, said liquid-holding cell means being disposed such that said distal end faces the specimen enclosure when the lid means is covering the open end of said tube body.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A centrifuge tube comprising:

a tube body defining a specimen enclosure therein and having an open end and an opposing closed end;

lid means for removably covering the open end of the tube body; and liquid-holding cell means formed on the lid means and terminating in an open distal end for holding a liquid component therein even when the open distal end is facing downwardly, said liquid-holding cell means being disposed such that said distal end faces the specimen enclosure when the lid means is covering the open end of said tube body;

wherein the lid means and the liquid-holding cell means collectively comprise capping means including:

a cap member having opposing upper and lower surfaces;

a hollow holding cell extending outwardly from the lower surface of the cap member and terminating in an open distal end;

wherein the hollow holding cell includes interior side walls, said centrifuge tube further comprising at least one sector wall attached at opposing edges thereof to opposing portions of the interior side walls of the cell so as to extend across the hollow cell and divide the cell into a plurality of holding sectors configured to hold corresponding plurality of liquid components in isolation from contact with each other.

2. The centrifuge tube of claim 1, wherein the liquid-holding cell means comprises at least one cell formed by side walls and being configured and dimensioned to receive the liquid component through the open distal end.

3. The centrifuge tube of claim 1, wherein the liquid-holding cell means is recessed within the lid means so as to form a part of the lid means such that said liquid-holding cell means and the lid means collectively form a one-piece unitary member.

4. The centrifuge tube of claim 1, wherein the tube body includes interior side walls and wherein the hollow holding cell is configured for telescopic insertion into the open end of the tube body, said cell being configured and dimensioned for continuous frictional engagement about a perimeter thereof against the interior side walls of the tube body to thereby establish a seal of the capping means over the open end of the tube body such that moisture is prevented from passing through said open end.

5. The centrifuge tube of claim 1, wherein the at least one sector wall comprises a plurality of intersecting walls secured at their edges to the interior side walls of the cell to thereby divide the cell into at least three holding sectors.

6. The centrifuge tube of claim 1, wherein the liquid-holding cell means is configured and dimensioned to enable all of the liquid component to be dislodged from the open distal end of said cell means so as to enable said liquid component to fall into the specimen enclosure when centrifugal force is applied to the tube body.

7. The centrifuge tube of claim 1,
wherein the liquid-holding cell means further comprises means having interior sidewalls defining a separation space therebetween for circumscribing the liquid component in substantially continuous contact around a circumference of said liquid component such that said component is disposed in frictional engagement against said sidewalls and spans and fills said separation space.

8. The centrifuge tube of claim 1, further including sealing means disposed on the lid means for sealing the lid means over the open end of the tube body such that moisture is prevented from passing through said open end.

9. The centrifuge tube of claim 8, wherein the sealing means comprises a tubular sealing wall extending outward from the lid means and around the liquid-holding cell means such that the tubular sealing wall and the liquid-holding cell cooperatively define an annular passage therebetween to thereby isolate the liquid-holding cell means from contact with the tubular sealing wall.

10. The centrifuge tube of claim 1, wherein the capping means further comprises sealing means disposed on the cap member for sealing the cap member over the open end of the tube body such that moisture is prevented from passing through said open end.

11. The centrifuge tube of claim 10, wherein the tube body includes interior side walls and wherein the sealing means comprises a tubular sealing wall extending outward from the cap member and around the hollow holding cell such that the tubular sealing wall and the hollow holding cell cooperatively define an annular passage therebetween to thereby isolate the liquid-holding cell means from contact with the tubular sealing wall, said sealing wall being configured and dimensioned for telescopic insertion into the open end of the tube body such that said tube wall is disposed in continuous frictional engagement about a perimeter thereof against the interior side walls of the tube body to thereby establish a seal of the cap member over the open end of the tube body such that moisture is prevented from passing through said open end.

12. A centrifuge tube comprising:
a container defining a specimen well therein and having an upper opening and a closed bottom region;
a lid having a bottom wall and being configured for covering the upper opening of the container; and
multiple liquid-holding compartments formed on the bottom wall of the lid, each compartment being configured for receiving a volume of liquid therein and holding said liquid so as to prevent said liquid from flowing from the compartment under the force of natural gravity, such that application of a centrifugal force to the container causes the liquid to flow from the compartment into the bottom region of the container.

13. The centrifuge tube of claim 12, wherein the lid further comprises a lid seal disposed on the bottom wall and wherein the liquid-holding compartments are comprised of radial walls which abut a concentric inner ring wall surrounded by the lid seal such that said radial walls do not contact the lid seal.

* * * * *